United States Patent
Muller et al.

(10) Patent No.: US 7,501,003 B2
(45) Date of Patent: Mar. 10, 2009

(54) COMPOSITE FILTER MEDIA

(75) Inventors: Jason William Muller, Newark, DE (US); Wai Sing Poon, Hockessin, DE (US)

(73) Assignee: Gore Enterprise Holdings, Newark, DE (US)

( * ) Notice: Subject to any disclaimer, the term of this patent is extended or adjusted under 35 U.S.C. 154(b) by 0 days.

(21) Appl. No.: 10/791,659

(22) Filed: Mar. 2, 2004

(65) Prior Publication Data

US 2005/0193696 A1 Sep. 8, 2005

(51) Int. Cl.
*B01D 46/12* (2006.01)

(52) U.S. Cl. .............................. 55/486; 55/497; 55/500; 55/502; 55/522; 55/498; 55/524; 55/528; 55/382; 55/DIG. 39; 96/66

(58) Field of Classification Search .................. 55/486, 55/497, 500, 502, 522, 498, 524, 528, 382, 55/485, 385.4, 521, DIG. 42, DIG. 39; 96/66
See application file for complete search history.

(56) References Cited

U.S. PATENT DOCUMENTS

| | | | | |
|---|---|---|---|---|
| 3,953,566 A * | 4/1976 | Gore | ........................... | 264/505 |
| 4,668,258 A * | 5/1987 | Steer | ............................. | 96/12 |
| 4,878,930 A | 11/1989 | Manniso et al. | ............... | 55/493 |
| 4,963,170 A * | 10/1990 | Weber et al. | .................... | 55/311 |
| 5,019,140 A * | 5/1991 | Bowser et al. | .................... | 96/6 |
| 5,108,474 A * | 4/1992 | Riedy et al. | .................... | 55/485 |
| 5,114,447 A * | 5/1992 | Davis | ........................... | 55/485 |
| 5,158,586 A * | 10/1992 | Layton | ......................... | 55/497 |
| 5,207,812 A | 5/1993 | Tronto et al. | ................... | 55/498 |
| 5,238,477 A * | 8/1993 | Layton | ......................... | 55/497 |
| 5,240,479 A * | 8/1993 | Bachinski | ....................... | 96/17 |
| 5,401,448 A | 3/1995 | Ricciardi et al. | ............... | 264/37 |
| 5,507,847 A * | 4/1996 | George et al. | .................. | 55/486 |
| 5,522,908 A * | 6/1996 | Frey | .............................. | 55/309 |
| 5,814,405 A | 9/1998 | Branca et al. | .......... | 428/311.51 |
| 6,214,093 B1 * | 4/2001 | Nabata et al. | ................... | 96/11 |
| 6,334,881 B1 * | 1/2002 | Giannetta et al. | ............. | 55/486 |
| 6,409,785 B1 | 6/2002 | Smithies et al. | ............... | 55/486 |
| 2003/0000389 A1 * | 1/2003 | Schultheiss et al. | ............ | 96/66 |
| 2003/0010210 A1 | 1/2003 | Kawano et al. | ............... | 95/287 |
| 2003/0145566 A1 * | 8/2003 | Parks et al. | .................... | 55/382 |

FOREIGN PATENT DOCUMENTS

| | | |
|---|---|---|
| EP | 0 395 331 | 10/1990 |
| EP | 0 576 343 | 12/1993 |
| WO | WO 00/62900 | 10/2000 |

* cited by examiner

*Primary Examiner*—Duane S Smith
*Assistant Examiner*—Minh-Chau T. Pham
(74) *Attorney, Agent, or Firm*—Richard W. Ellis (57) ABSTRACT

The invention provides a renewable composite filter media for removal of particles from a fluid stream. The filter media includes a membrane filtration layer comprising a porous polymeric membrane having an upstream side and a downstream side relative to the direction of fluid flow, a first depth filtration media layer having an upstream side and a downstream side relative to the direction of fluid flow, the first depth filtration media layer being disposed on upstream side of the membrane filtration layer; and at least one additional depth filtration media layer removably attached to the upstream side of the first depth filtration media layer. In this aspect, the first depth filtration media layer may be removably attached to the membrane filtration layer.

28 Claims, 8 Drawing Sheets

COMPOSITE FILTER MEDIA

BACKGROUND

The removal of particulates from a gas stream has long been a practice in a variety of industrial fields. Conventional means for filtering particulates and the like from gas streams include, but are not limited to, filter bags, filter tubes, filter panels and filter cartridges. For convenience herein, the term "filter element" will be used to refer collectively to these types of filtration means.

Selection of the type of filtration media used is typically based on the fluid stream with which the filter element comes in contact, the operating conditions of the system and the type of particulates being filtered.

The flow of fluids, whether liquid or gas, produces a pressure differential, or pressure drop, across the element. Preferably, the pressure differential is as small as possible for a given fluid flow rate in order to minimize the power required to filter the fluid. Over time, however, the pressure drop can increase as filtered particles accumulate on the filter element. When the limits of acceptable pressure differential or flow rate reduction have been reached, the filter element must be either replaced or cleaned.

Filter media may be broadly characterized as either depth filtration media or surface filtration media. Particles tend to penetrate somewhat and accumulate within depth filtration media. In contrast, the majority of particles collect on the surface of surface filtration media.

Many materials are known to be useful as depth filtration media, including spun bond or melt blown webs, felts and fabrics made from a variety of materials, including polyesters, polypropylenes, aramids, cellulose, glasses and fluoropolymers. Known melt blown filter media demonstrate high efficiency and low pressure drop. Melt blown filter media also have high dust capacity. However, melt blown filter media suffer from relatively low water entry pressures, which may make them unsuitable for outdoor use in some environments.

Providing a static electric charge to depth filtration media such as melt blown media improves its filtration efficiency. Electrostatic filter materials, or electrets, have electrostatically enhanced fibers which enhance filter performance by attracting particles to the fibers, and retaining them. Electrostatic filters rely on charged particles to dramatically increase collection efficiency for a given pressure drop across a filter. Pressure drop in an electrostatic filter also generally increases at a slower rate than it does in a mechanical filter of similar efficiency.

Electrostatic media may lose efficiency during use, particularly when used in an environment in which the filter element is exposed to moisture or oily particles. Many of the particles and contaminants with which electrostatic filters come into contact interfere with their filtering capabilities. Liquid aerosols, for example, particularly oily aerosols, tend to cause electret filters to lose their electrostatically-enhanced filtering efficiency.

To reduce these effects, the amount of the non-woven polymeric web in the electret filter may be increased by adding layers of web or increasing the thickness of the electret filter web. The additional web, however, increases the pressure drop across the electret filter and adds weight and bulk.

Surface filters, such as membranes, have gained popularity in certain applications, particularly outdoor environments or those in which the fluid to be filtered contains liquid aerosols or harsh chemicals. In other applications, membrane filter media is useful because it has a more constant filtration efficiency than that of depth filtration media. Membranes have stable filtration efficiency because, unlike depth filtration media, a membrane filter's efficiency is not dependent upon the buildup of a cake of dust particles.

Polytetrafluoroethylene (PTFE) has demonstrated utility in many areas such as harsh chemical environments, which normally degrade many conventional metals and polymeric materials. A significant development in the area of particle filtration was achieved when expanded PTFE (ePTFE) membrane filtration media were incorporated as surface laminates on conventional filter elements. Examples of such filtration media are taught in U.S. Pat. No. 4,878,930, and U.S. Pat. No. 5,207,812, which are directed to filter cartridges for removing particles of dust from a stream of moving gas or air. Membranes constructed of ePTFE are advantageously water tight. However, membranes may exhibit relatively high pressure drop when compared to depth filtration media and have relatively low dust capacity. Accordingly, in some applications, filter elements using membranes will need frequent replacement or cleaning.

SUMMARY

The present invention is directed toward an improved composite filter media for removal of particles from a fluid. Specifically, the invention provides a renewable composite filter.

In one aspect, the present invention provides a renewable composite filter media for removal of particles from a fluid stream comprising a membrane filtration layer comprising a porous polymeric membrane having an upstream side and a downstream side relative to the direction of fluid flow, a first depth filtration media layer having an upstream side and a downstream side relative to the direction of fluid flow, the first depth filtration media layer being disposed on the upstream side of the membrane filtration layer; and at least one additional depth filtration media layer removably attached to the upstream side of the first depth filtration media layer. In this aspect, the first depth filtration media layer may be removably attached to the membrane filtration layer. Preferably, the renewable composite filter media includes a support layer. More preferably, the support layer is disposed on the downstream side of the membrane filtration layer.

In one aspect, the preferred membrane filtration layer comprises ePTFE. In another aspect, the preferred membrane filtration layer has a permeability of at least about 3 Frazier, more preferably at least about 15 Frazier and most preferably at least about 80 Frazier.

In another aspect, the preferred depth filtration media layer is a non-woven fibrous polymeric web, the fibers have an electrostatic charge. Preferably, the depth filtration media layer has a permeability of at least about 30 Frazier, more preferably at least about 100 Frazier and most preferably at least about 200 Frazier.

In another aspect, the invention provides a composite filter media for removal of particles from a fluid stream comprising a membrane filtration layer comprising a porous polymeric membrane, the membrane filtration layer having an upstream side and a downstream side relative to the direction of fluid flow; and at least one depth filtration media layer comprising fibers having an electrostatic charge, the depth filtration media layers being disposed on the upstream side of the membrane filtration layer.

In still another aspect, the invention is a renewable composite filter for removal of particles from a fluid stream comprising; a membrane filtration layer comprising a porous polymeric membrane having an upstream side and a downstream side relative to the direction of fluid flow; a support layer having an upstream side and a downstream side relative to the direction of fluid flow, the support layer disposed on the upstream side of the membrane filtration layer; a first depth filtration media layer having an upstream side and a downstream side relative to the direction of fluid flow, the first depth filtration media layer disposed on the upstream side of the support layer; and at least one additional depth filtration media layer removably attached to the upstream side of the first depth filtration media layer. In this aspect, the first depth filtration media layer may be removably attached to the support layer.

In yet another aspect, the invention provides a renewable composite filter for removal of particles from a fluid stream, the renewable composite filter comprising a filter frame; a pleated laminate comprising an ePTFE membrane and a support layer, the laminate having an upstream side and a downstream side relative to the direction of fluid flow, the laminate disposed within the frame and having an air permeability of about 3 Frazier to about 15 Frazier, and a particle filtration efficiency of at least 90% for 0.3 micron sized particles; and at least one pleated eletrostatically charged melt blown filter media having an air permeability of about 30 Frazier to about 150 Frazier and a particle filtration efficiency of at least 50% for 0.3 micron sized particles, the at least one pleated electrostatically charged melt blown filter media disposed on the upstream side of the membrane such that the apices of the membrane and the melt blown filter are aligned, the melt blown filter media layer further comprising perforations adjacent to the frame; and wherein the melt blown filter media is removable from the frame by tearing at the perforations.

DETAILED DESCRIPTION

The present invention is directed to the art of filtration of fluids and, more specifically, to a composite filter media. In one aspect, the composite filter media in accordance with the present invention is renewable by removing the upstream-most layer of the multi-layer filter media.

The composite filter media of the present invention provides at least two filtration layers: a membrane filtration layer and at least one depth filtration layer. The membrane filtration layer comprises a porous polymeric membrane. Positioned upstream of the membrane filtration layer relative to the direction of fluid flow is at least one depth filtration media layer. Optionally, the composite filter media may include a support layer. The support layer may be positioned either upstream or downstream of the membrane filtration layer relative to fluid flow through the filter. Optionally, the support layer may be laminated to the membrane.

In one aspect, the composite filter of the present invention is renewable. As used herein, a filter media is "renewable" when, after use, the filter media is capable of recovering at least 85% of its initial permeability while maintaining acceptable filtration efficiency. In this aspect, the composite filter is renewable by removing the upstream-most layer of depth filtration media after use.

The composite filter media includes at least one depth filtration media layer, such as a melt blown or spun bond web consisting of polypropylene or polyethylene, non-woven polyester fabric, fiberglass, microfiberglass, cellulose, and polytetrafluoroethylene. Preferably, the composite filter includes at least one melt blown polymer fiber web.

Melt blown webs are produced by entraining melt spun fibers with convergent streams of heated air to produce extremely fine filaments. Melt blown processing forms continuous sub-denier fibers, with relatively small diameter fibers that are typically less than 10 microns.

The melt blown polymer fiber web layer(s) can be made from a variety of polymeric materials, including polypropylene, polyester, polyamide, polyvinyl chloride, polymethylmethacrylate, and polyethylene. Polypropylene is among the more preferred polymeric materials. Typically, the polymer fibers that form the web have a diameter in the range of about 0.5 µm to about 10 µm. Preferably, the fiber diameter is about 1 µm to about 5 µm.

The thickness of the depth filtration layers is not critical. If the depth filtration media is a melt blown web, for example, the thickness may be from about 0.25 mm to about 3 mm. Greater thickness results in higher dust capacity; however, excessively thick depth filtration media layers may limit the total number of layers that can be used in the composite filter media.

The selection of the basis weight of the depth filtration media is also within the capability of those of skill in the art. The weight of a melt blown polymer fiber web may, for example, be in the range of about 1 g/m$^2$ to about 100 g/m$^2$, preferably the basis weight of the melt blown fiber web is about 10 g/m$^2$ to about 50 g/m$^2$.

In one aspect, the depth filtration media includes at least one electret filter media layer comprising a highly efficient layer having an electrostatic charge. Electric charge can be imparted to melt blown fibrous webs to improve their filtration performance using a variety of known techniques.

For example, a suitable web is conveniently cold charged by sequentially subjecting the web to a series of electric fields, such that adjacent electric fields have substantially opposite polarities with respect to each other, in the manner taught in U.S. Pat. No. 5,401,446, to Tsai et al. As described therein, one side of the web is initially subjected to a positive charge while the other side of the web is initially subjected to a negative charge. Then the first side of the web is subjected to a negative charge and the other side of the web is subjected to a positive charge. However, electret filter materials may also be made by a variety of other known techniques.

The depth filtration media may also contain additives to enhance filtration performance and may also have low levels of extractable hydrocarbons to improve performance. The fibers may contain certain melt processable fluorocarbons, for example, fluorochemical oxazolidinones and piperazines and compounds or oligomers that contain perfluorinated moieties. The use of such additives can be particularly beneficial to the performance of an electrically charged web filter.

A variety of techniques are useful to facilitate removal of a depth filtration layer in a renewable composite filter media. A removable layer may be perforated to allow it to be torn from the remaining layers. Preferably, the perforations are in a pattern around the perimeter of the filter media. Alternatively, the layer may be crush cut with a dull blade. In dull blade crush cutting, a dull blade is forced through the layer such that the fiber web is separated. However, the use of a dull blade promotes entanglement of the cut fibers. The entangled fibers help keep the layer in position, but the filter media is easily separated at the cut line to remove the filter layer. In yet another removal method, a first depth filter media layer is bonded to a second filter only at the perimeter of the layers; to remove the layer, the unbonded portion of the first filter layer is torn from the bonded perimeter. In still another technique, the filter frame includes a sharp edge or "knife edge" at the perimeter of the filter frame. Each depth filtration media layer is removed by tearing it against the knife edge. Any of the techniques described above may be used alone or in combination with other techniques described or known in the art.

Downstream of the depth filtration layer is a microporous polymeric membrane filtration layer. The microporous polymeric membrane is intended to capture particles that pass through the removable depth filtration layers. Microporous polymeric membranes have demonstrated dependability and reliability in removing particles and organisms from fluid streams. Membranes are usually characterized by their polymeric composition, air permeability, water intrusion pressure and filtration efficiencies.

A variety of microporous polymeric membranes can be used as the membrane filtration layer, depending on the requirements of the application. The membrane filter layer may be constructed from the following exemplary materials: nitrocellulose, triacetyl cellulose, polyamide, polycarbonate, polyethylene, polypropylene, polytetrafluoroethylene, polysulfone, polyvinyl chloride, polyvinylidene fluoride, acrylate copolymer.

The membrane filtration layer is preferably constructed from a hydrophobic material that is capable of preventing the passage of liquids. The membrane filtration layer must be able to withstand the applied differential pressure across the filter media without any liquid passing through it. The preferred membrane has a water intrusion pressure of 0.2 bar to 1.5 bar and an average air permeability of about 7 Frazier to about 100 Frazier, and more preferably, an average air permeability of about 10 Frazier to about 40 Frazier.

Preferably, the membrane filtration layer is a microporous flouropolymer, such as ePTFE, flourinated ethylenepropylene (FEP), perfluoronalkoxy polymer (PFA), polypropylene (PU), polyethelene (PE) or ultra high molecular weight polyethelyne (uhmwPE).

Most preferably, the membrane filtration layer comprises ePTFE. Suitable ePTFE membranes are described in U.S. Patent No. 5,814,405. The membranes described therein have good filtration efficiency, high air flow and burst strength. Methods of making suitable ePTFE membranes are fully described therein and are incorporated herein by reference. These ePTFE membranes are available from W. L. Gore and Associates, Inc. of Newark, Del. However, ePTFE membranes constructed by other means can also be used.

The membrane filtration layer may optionally contain a filler material to improve certain properties of the filter. Suitable fillers, such as carbon black, or other conductive filler, catalytic particulate, fumed silica, colloidal silica or adsorbent materials, such as activated carbon or ceramic fillers, such as activated alumina and $TiO_2$, and methods preparing filled membranes useful in the present invention are fully described in U.S. Pat. No. 5,814,405.

A support layer may be provided to maintain the filtration layers in the proper orientation to fluid flow. Preferred supporting material must be rigid enough to support the membrane and removable layers, but soft and supple enough to avoid damaging the membrane. The support layer may comprise non-woven or woven fabrics. Other examples of suitable support layer materials may include, but are not limited to, woven and non-woven polyester, polypropylene, polyethylene, fiberglass, microfiberglass, and polytetrafluoroethylene. In a pleated orientation, the material should provide airflow channels in the pleats while holding the pleats apart (i.e., preventing the pleats from collapsing). Materials such as a spunbonded non-wovens are particularly suitable for use in this application.

The support layer may be positioned upstream or downstream of the membrane filtration layer. Optionally, a support material may be laminated to the membrane filtration layer to form a base layer. In this aspect, the base layer advantageously provides both support to the overlaying melt blown media layers and acts as the final filtration surface.

Figure 1:
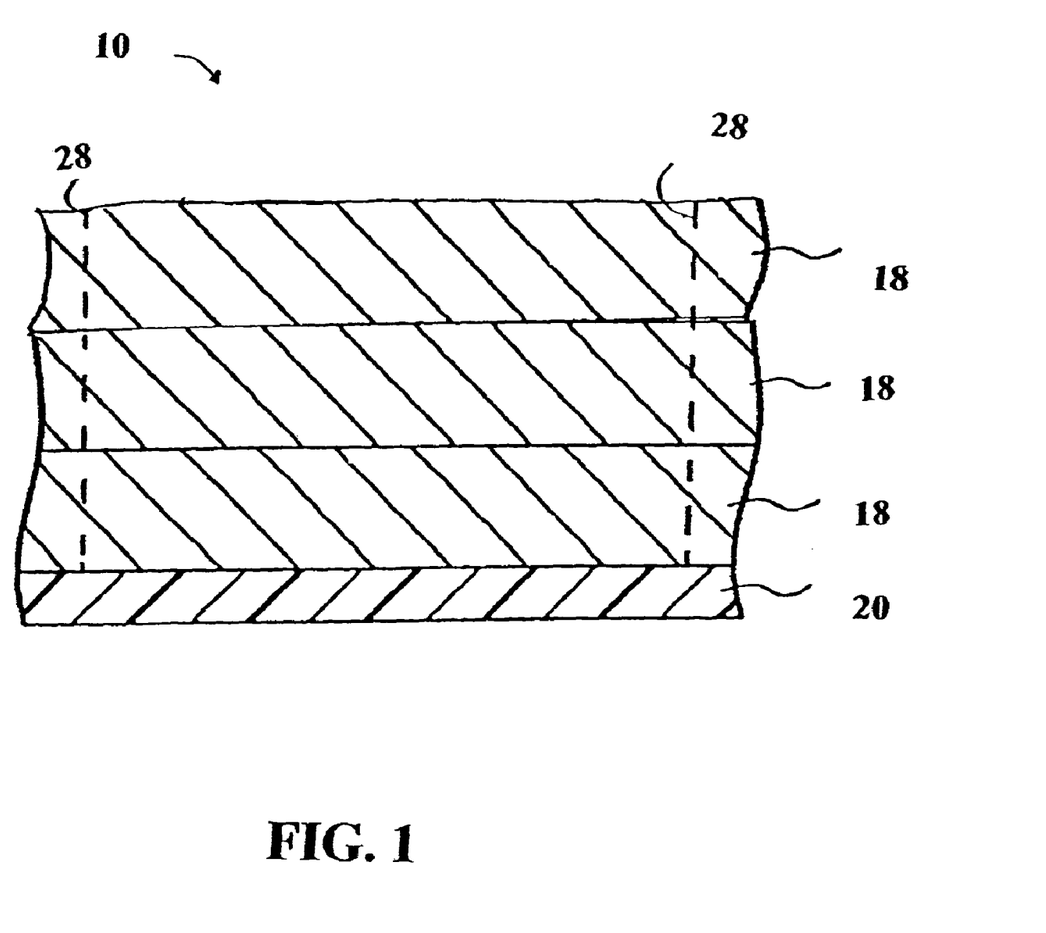
FIG. 1 is a cross sectional view of one aspect of the renewable composite filtration media.
Figure 2:
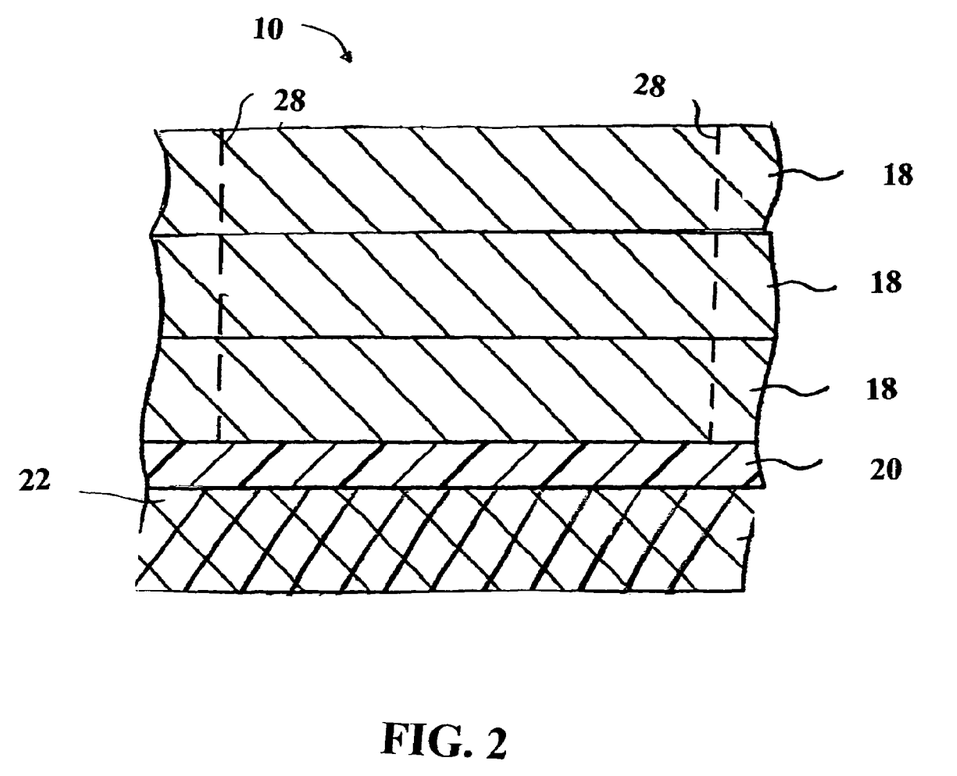
FIG. 2 is a cross sectional view of another aspect of the renewable composite filtration media.
Figure 3:
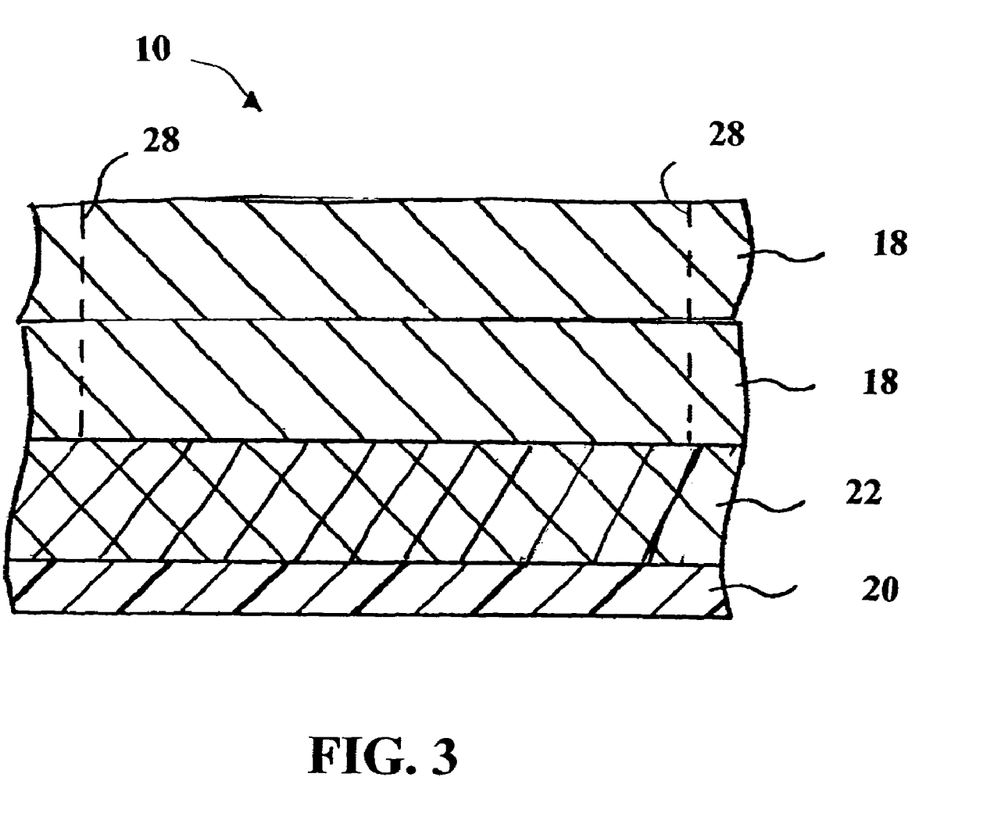
FIG. 3 is a cross sectional view of still another aspect of the renewable composite filtration media.

FIGS. 1-3 show cross-sections of several aspects of the composite filter media 10. Depth filtration media layers 18 are positioned upstream of membrane filtration layer 20. Perforations 28 allow the depth filtration media layers 18 to be removed.

Shown in FIG. 2 is a filtration media 10 in accordance with another aspect of the present invention showing support layer 22 disposed on the downstream side of the membrane filtration layer 20. Optionally, the support layer 22 is laminated to the membrane filtration layer 20. FIG. 3 shows yet another aspect of the present invention, in which support layer 22 is disposed on the upstream side of the membrane and may be laminated to it. Depth filtration media layers 18 are positioned on the upstream side of the support layer 22.

Figure 4:
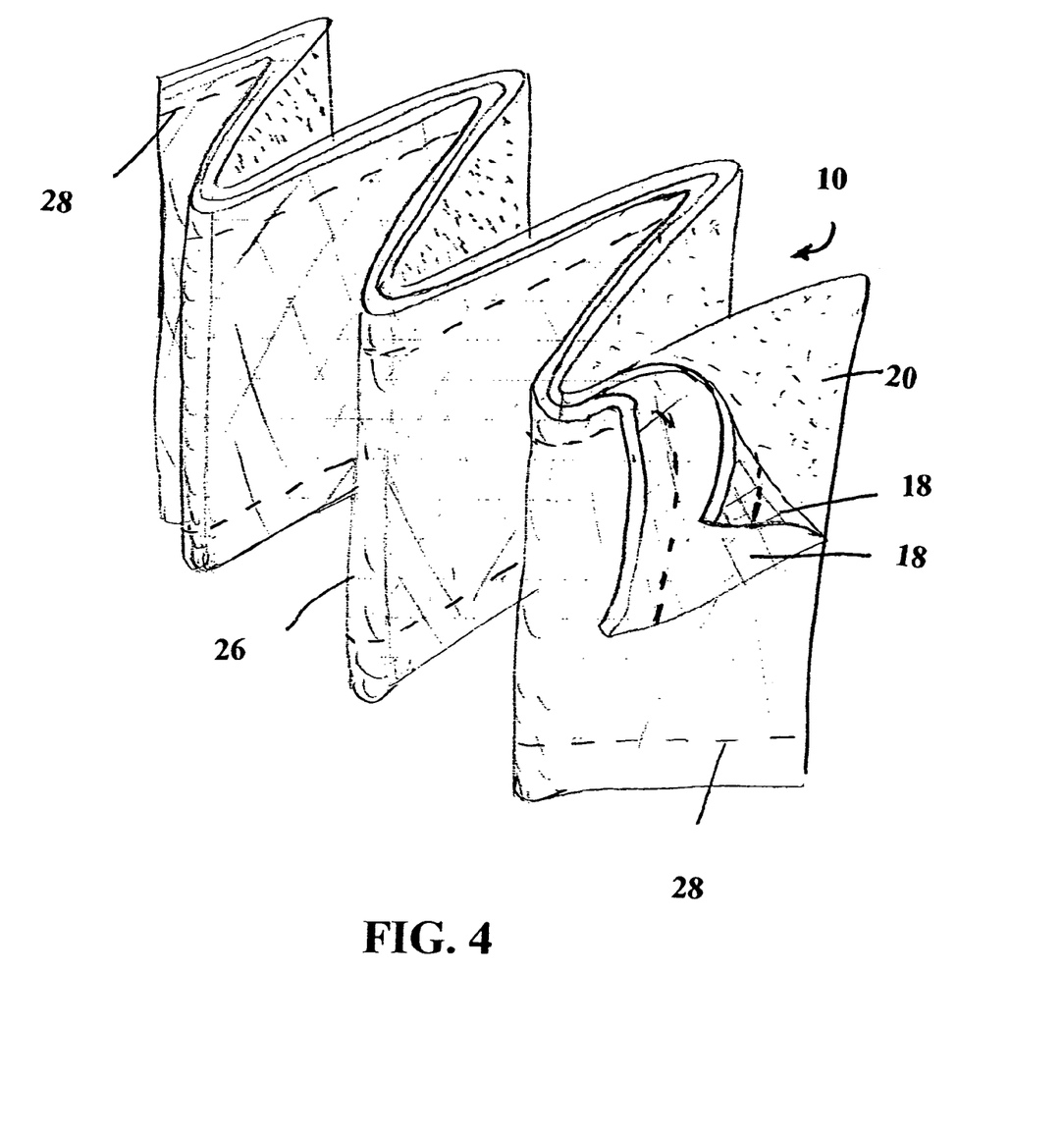
FIG. 4 is a perspective view of filtration media embodying one aspect of the present invention.

As may be better seen in FIG. 4, the filtration media 10 is preferably folded upon itself in a pleated fashion so as to provide better structural integrity and to significantly increase the exposed surface area for filtration. The media is pleated, such that the apices 26 of the pleats are aligned.

Figure 5:
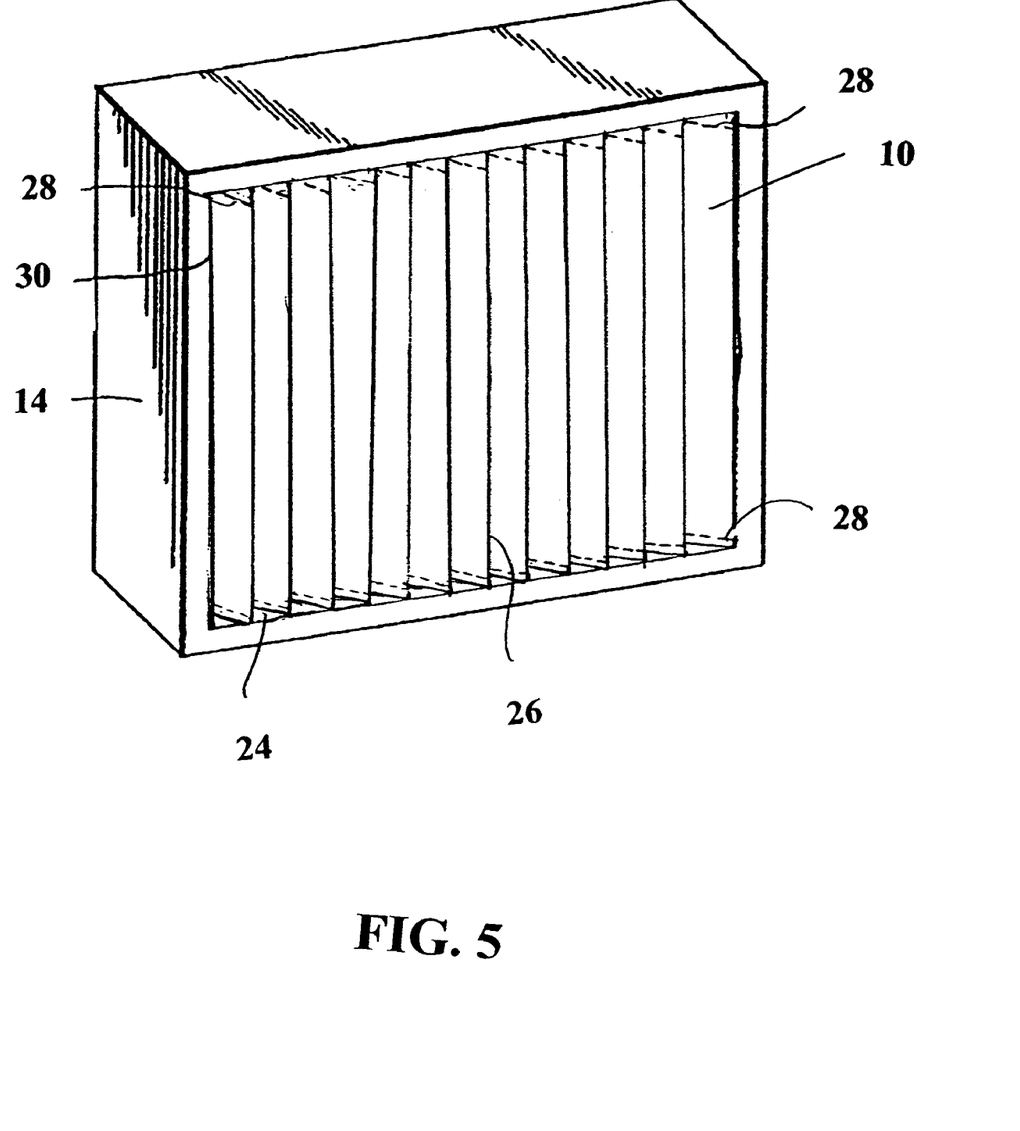
FIG. 5 is a perspective view of a filter embodying one aspect of the present invention.

FIG. 5 Illustrates the novel filter with filtration media 10 mounted within a frame 14. The dimensions of the frame 14 are application specific and should be designed to provide a tight fit within a conduit carrying the fluid to be filtered. The frame can be of any material, such as metals, including aluminum or galvanized steel or a structural polymer. Preferably, the frame is constructed of anodized aluminum. Optionally, the frame may incorporate a knife edge 30 proximate to the filter media to facilitate removal of layers. The filter media 10 should be mounted into the frame 14 so as to create an airtight fit between the filtration media 10 and the frame 14 and avoid the seepage of unfiltered air around the filtration media 10. Ideally, the filtration media is mounted to the frame 14 using a potting material 24, such as polyurethane, epoxy, silicone, hot-melt adhesive, or plastisol. In order to establish a tight seal, the potting material 24 should be chosen or treated to wet-out into the filtration media 10 so as to assure a continuous seal.

In one aspect, the renewable composite filtration media according to the present invention is renewable by removal of the upstream most filtration layer. When the renewable filter is placed within the flow of a fluid containing particles to be removed there is an initial pressure drop across the filter media. As filtration takes place, particles will accumulate on the filtration media, primarily within the upstream-most depth filtration media layer. As such particles accumulate, the pressure drop across the filter media will increase. When the pressure drop is unacceptable for the application, the filtration media in accordance with the present invention is renewed by removing the upstream-most depth filtration media layer to expose the underlying clean filtration layer, which is either another depth filtration media layer, the membrane filtration layer or support layer. Upon removal of the upstream-most layer, the pressure drop across the filter media will be less than or equal to about 120% of the initial pressure drop across the filter media.

TEST METHODS

Permeability

Air permeability can be determined according to a Frazier number test method. In this method, air permeability is measured by clamping a test sample in a gasketed-flanged fixture, which provides a circular section of approximately 2.75 inches in diameter and 6 square inches in area for air flow measurement. The upstream side of the sample fixture is connected to a flow meter in line with a source of dry compressed air. The downstream side of the sample fixture is open to the atmosphere. Testing is accomplished by applying an air pressure of 0.5 inches of water to the upstream side of the sample and recording the flow rate of the air passing through the in-line flowmeter (a ball-float rotameter). The sample is conditioned at 21° C. and 65% relative humidity for at least 4 hours prior to testing. Results are reported in terms of Frazier Number which has units of cubic feet/minute/square foot of sample at 0.5 inches of water pressure.

Dust Capacity:

Dust capacity may be determined according to the following method. A 3% aqueous sodium chloride solution is atomized using a constant output atomizer (TSI Model 3096; Shoreview, Minn.). The particles are dried by heating to 80° C. and then diluted with clean dry air. The particle size distribution is measured by an aerodynamic particle sizer (e.g., TSI Model 3320; Shoreview, Minn.). The geometric mean particle diameter and standard deviation are determined.

The filter test sample, 44.4 mm in diameter, is weighed prior to testing and is placed inside a filter holder. The face velocity is set to 53 mm/s. The pressure drop across the filter is monitored continuously by a pressure transducer (e.g., Heise Model PM10; Stratford, Conn.). The filter is loaded with the sodium chloride aerosol until the final pressure drop across the filter media reaches 750 Pa. The test sample is weighed again after the test to determine the mass loading. The dust loading capacity is the difference between the final and initial mass of the test sample.

Filtration Efficiency:

The particle collection efficiency is measured by an automated efficiency tester (e.g., Model 8160, available from TSI, Inc., St Paul, Minn.). The test is performed at ambient room temperature (70° F.) and relative humidity conditions (40%). A dioctyl-phthalate (DOP) solution is atomized to generate an aerosol containing particles from 0.03 to 0.5 microns in diameter. The filter sample is challenged with the aerosol at air flow velocity of 5.3 cm/s. Two condensation nucleus particle counters measure the particle concentrations upstream and downstream of the test sample simultaneously. The particle collection efficiency is reported as the percentage of upstream challenge particles collected by the filter.

COMPARATIVE EXAMPLE 1

Figure 6:
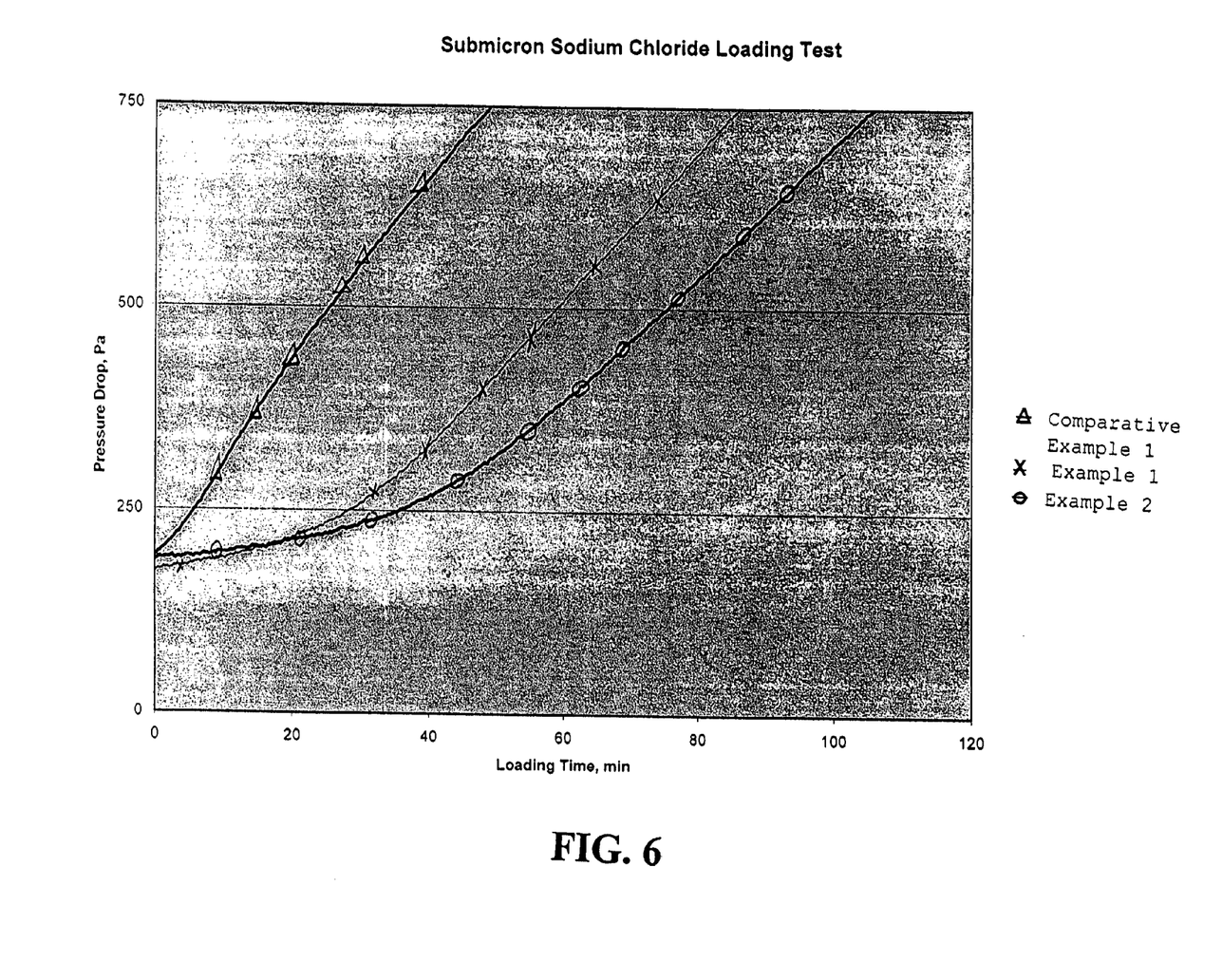
FIG. 6 is a graph showing the improved performance of the composite filter media in accordance with one aspect of the present invention over membrane filters.

A microporous ePTFE membrane laminate, available from W.L. Gore & Associates, Inc. (Newark, Del.), illustrates the loading capacity of membrane filter. The ePTFE membrane has air permeability in the range of 18 to 29 Frazier, ball burst strength greater than 0.2 bar, weight about 5 g/m$^2$. The ePTFE membrane is bonded to a polyester spunbond support material (available from Toray, Japan) with basis weight of 270 g/m$^2$, air permeability between 28 to 32 Frazier, and mullen burst greater than 14 bar. The membrane is bonded to the support material at temperature between 180° C. and 350° C., and pressure between 0.1 to 7 bar. The resulting ePTFE laminate has air permeability between 5 to 8 Frazier. The filter is loaded with sodium chloride aerosol in accordance with the test procedure described previously until pressure drop reaches 750 Pa. The dust loading curve for the laminate is shown in FIG. 6. The total dust loading capacity is 14 mg.

EXAMPLE 1

A layer of 10 g/m$^2$ melt blown media (DelPore 6001-10P, available from DelStar, Inc.; Middletown, Del.) are placed upstream of the ePTFE membrane laminate of comparative example 1 to form a composite media. The melt blown media is made of 10 g/m$^2$ polypropylene meltblown layer and 10 g/m$^2$ polyester spun bond scrim. The polypropylene fibers have diameters of from 1 to 5 µm. The mean pore size is about 15 µm and the media thickness is about 0.2 mm. The air permeability of the depth filtration layer is about 130 Frazier. The media is electrically charged to enhance particle collection efficiency. The filter is loaded with sodium chloride aerosol in accordance with the test procedure described previously until pressure drop reaches 750 Pa. The loading curve is depicted in FIG. 6.

EXAMPLE 2

A depth filtration media layer of 30 g/m$^2$ melt blown media (DelPore 6001-30P, available from DelStar, Inc.; Middletown, Del.) is positioned upstream of the microporous ePTFE laminate of Comparative Example 1 to form a composite media. The melt blown media is made of 30 g/m$^2$ polypropylene fibers layer and 10 g/m$^2$ polyester spun bond scrim. The polypropylene fibers have diameters from 1 to 5 µm. The mean pore size is about 15 mm and the media thickness is about 0.56 mm. The air permeability of the meltblown is about 37 Frazier. The media is electrically charged to enhance particle collection efficiency. Two layers of this meltblown media are placed upstream of the microporous ePTFE laminate. The filter is loaded with sodium chloride aerosol as described previously until pressure drop reaches 750 Pa. The results are depicted in FIG. 6.

EXAMPLE 3

Two layers of the 10 g/m$^2$ melt blown media used in Example 1 were positioned upstream of the membrane layer of Comparative Example 1. The filter was loaded with sodium chloride aerosol as described above. Upon reaching the terminal pressure drop, the top melt blown layer is removed and weighed to determine the dust holding capacity of the first layer. The loading is repeated for the second meltblown layer. Finally, the microporous ePTFE laminate is loaded with dust particles.

Figure 7:
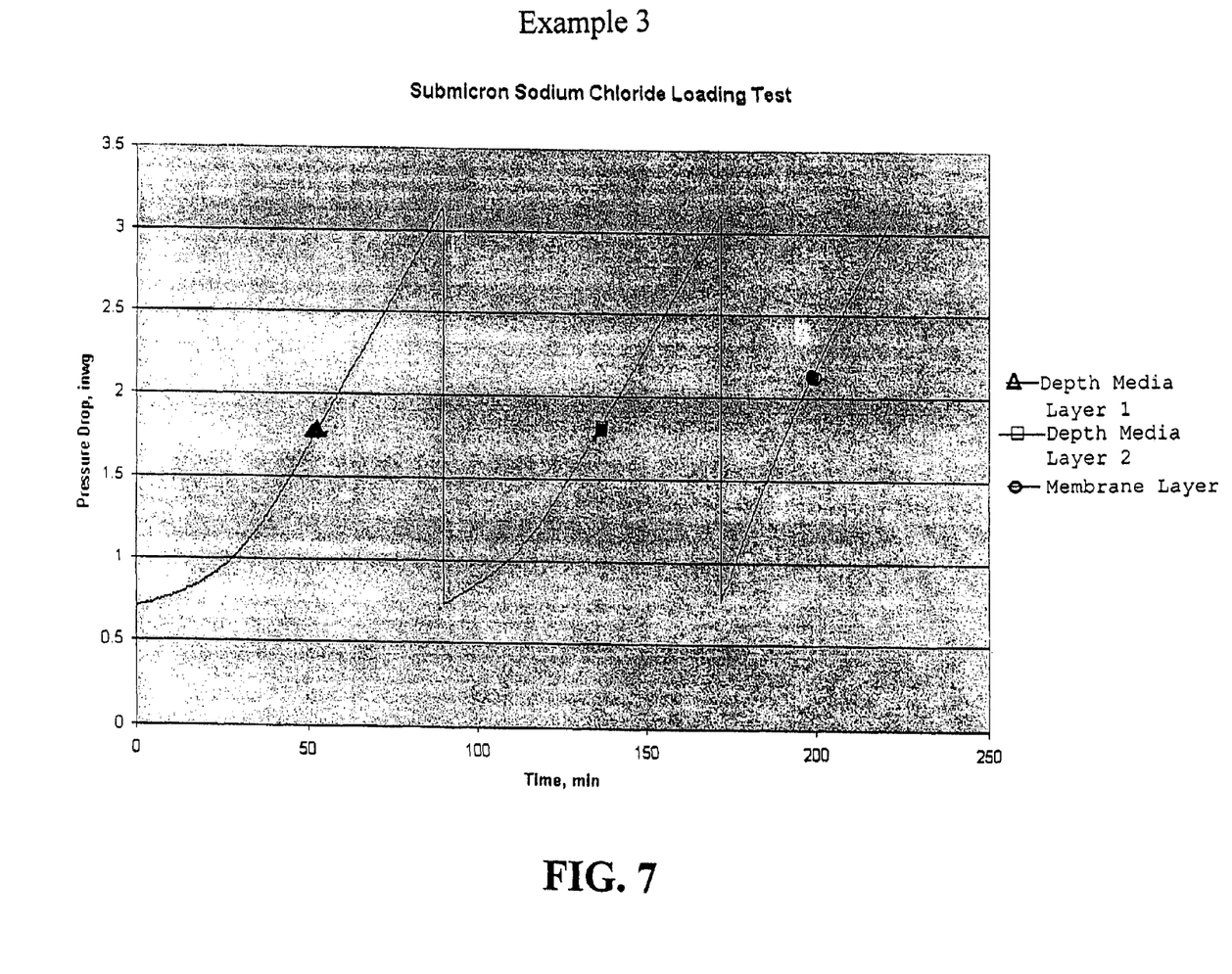
FIG. 7 is a graph showing permeability recovery of the novel filter media after the media is renewed by removing the upstream-most depth filtration media layer.

The dust loading curves are shown in FIG. 7. The dust holding capacities for the first and second meltblown layers and the ePTFE layer are 26, 23 and 13 mg, respectively. Therefore, the total capacity is 62 mg. Table 1 shows the initial filtration efficiency for 0.1 µm particles as well as the filtration efficiencies after each renewal.

With reference to FIG. 7 and Table 1, it can be seen that the filter is renewed by removal of the upstream-most layer. FIG. 7 Shows that the pressure drop and Table 1 shows the filtration efficiency after removal; the permeability of the composite filter media is restored without significant loss of filtration efficiency. Accordingly, the dust holding capacity of the renewable composite filter is over 400% of the single ePTFE laminate of Comparative Example 1.

TABLE 1

| Initial Filtration Efficiency | Filtration Efficiency (First Renewal) | Filtration Efficiency (Second Renewal) | Total Filtration Efficiency Change |
|---|---|---|---|
| 98.513% | 97.516% | 95.141% | −3.4% |

EXAMPLE 4

Two layers of the 30 g/m² melt blown media used in Example 2 were positioned upstream of the membrane layer of Comparative Example 1. The filter was loaded with sodium chloride aerosol until the terminal pressure drop is reached. The top meltblown layer is removed and weighed to determine the dust holding capacity of the first layer. The loading is repeated for the second meltblown layer. Finally, the microporous ePTFE laminate is loaded.

Figure 8:
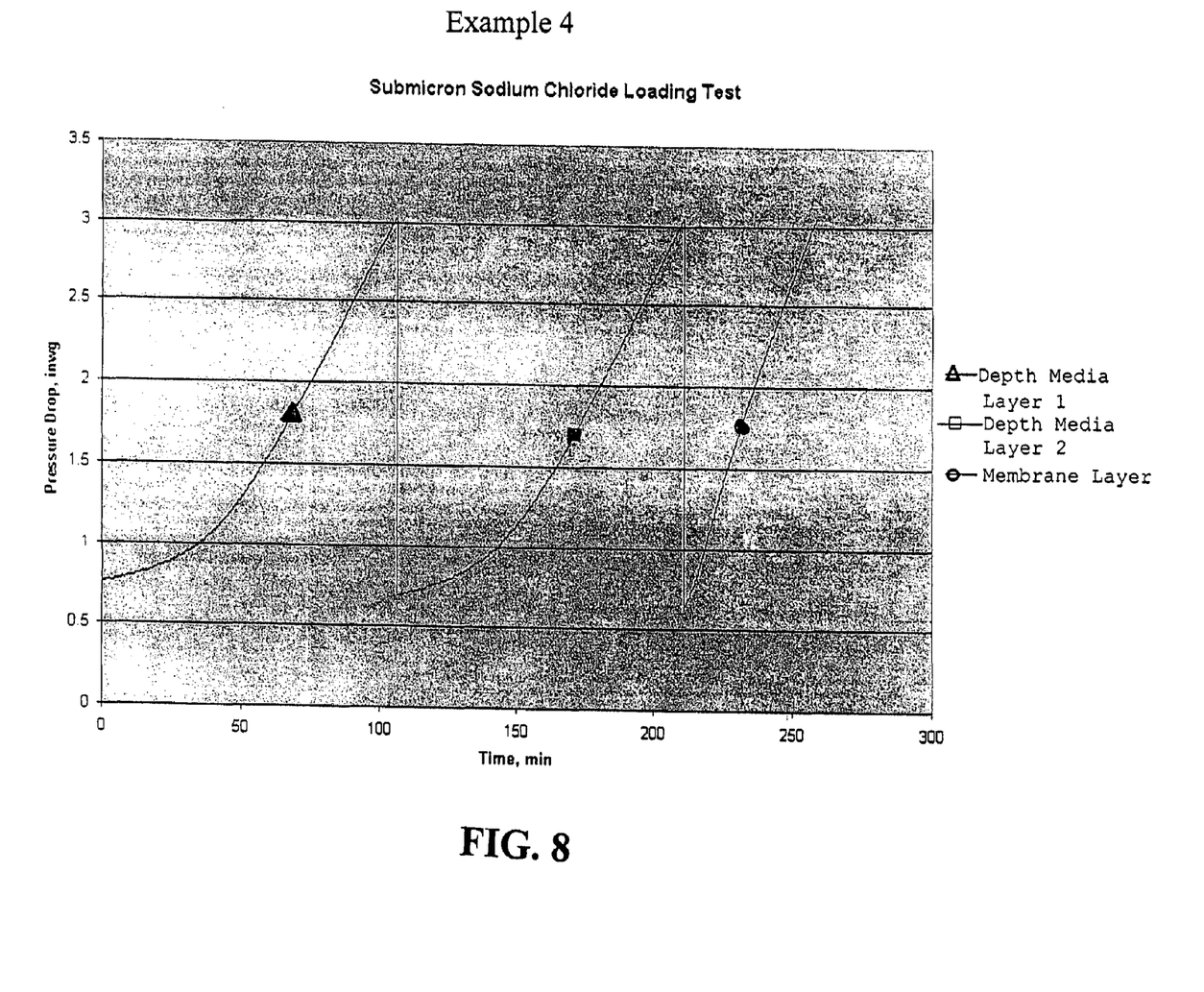
FIG. 8 is a graph showing permeability recovery of the novel filter media after the media is renewed by removing the upstream-most depth filtration media layer.

The dust loading curves are shown in FIG. 8. The dust holding capacities for the first and second meltblown layers, and ePTFE layer are 29, 29 and 14 mg, respectively. The combined dust holding capacity is 72 mg. Table 2 shows the initial filtration efficiency for 0.1 μm particles as well as the filtration efficiencies after each renewal.

With reference to FIG. 8 and Table 2, it can be seen that the filter is renewed by removal of the upstream-most layer. FIG. 8 Shows the pressure drop and Table 2 shows the filtration efficiency after removal; the permeability of the composite filter media is restored without significant loss of filtration efficiency. Accordingly, the combined dust holding capacity of the filter in accordance with Example 4 is over 500% compared to the ePTFE laminate of Comparative Example 1.

TABLE 2

| Initial Filtration Efficiency | Filtration Efficiency (First Renewal) | Filtration Efficiency (Second Renewal) | Total Filtration Efficiency Change |
|---|---|---|---|
| 99.738% | 99.085 | 95.141 | −4.6% |

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A composite filter media for removal of particles from a fluid stream comprising:
    a) a membrane filtration layer comprising porous hydrophobic ePTFE, the membrane filtration layer having an upstream side and a downstream side relative to the direction of fluid flow and an air permeability at least about 5 Frazier; and
    b) at least one meltblown filtration media layer comprising fibers, said fibers being less than 5 μm and having an electrostatic charge, the at least one meltblown filtration media layer disposed directly on the upstream side of the membrane filtration layer; and
    c) support layer disposed on the downstream side of the membrane filter layer, wherein the composite filter media has a dust capacity of at least 10 mg.

2. The composite filter media of claim 1, in which the support layer is laminated to the membrane filtration layer.

3. The composite filter media of claim 1, in which the membrane filtration layer further comprises filler material selected from the group consisting of carbon, carbon black, activated carbon, TiO$_2$, platinum, colloidal silica, and fumed silica.

4. A renewable composite filter media for removal of particles from a fluid stream comprising:
    a) a membrane filtration layer comprising a porous hydrophobic ePTFE, the membrane filtration layer having an upstream side and a downstream side relative to the direction of fluid flow and an air permeability of at least about 5 Frazier;
    b) a first meltblown filtration media layer having an upstream side and a downstream side relative to the direction of fluid flow, the first meltblown filtration media layer having an electrostatic charge, the meltblown filtration media layer being disposed directly on the upstream side of the membrane filtration layer; and
    c) further comprising a support layer disposed on the downstream side of the membrane filtration layer
    d) at least one additional meltblown media layer having an electrostatic charge and removably attached to the upstream side of the first depth filtration media layer;
    wherein the renewable composite filter media has a dust holding capacity of at least 40 mg.

5. The renewable composite filter media of claim 4, in which the first meltblown filtration media layer is removably attached to the membrane filtration layer.

6. The renewable composite filter of claim 4, in which the support layer is laminated to the membrane filtration layer.

7. The renewable composite filter media of claim 4, in which the membrane filtration layer further comprises filler material selected from the group consisting of carbon, carbon black, activated carbon, TiO$_2$, platinum, colloidal silica, and fumed silica.

8. The renewable composite filter media of claim 4, further comprising at least two additional meltblown filtration media layers removably attached to the upstream side of the first meltblown filtration media layer.

9. The renewable composite filter media of claim 4, in which the membrane filtration layer has a permeability of at least about 7 Frazier.

10. The renewable composite filter media of claim 4, in which the membrane filtration layer has a permeability of at least about 15 Frazier.

11. The renewable composite filter media of claim 4, in which the membrane filtration layer has a permeability of at least about 80 Frazier.

12. The renewable composite filter media of claim 4, in which each of the meltblown filtration media layers has a permeability of at least about 30 Frazier.

13. The renewable composite filter media of claim 4, in which each of the meltblown filtration media layers has a permeability of at least about 100 Frazier.

14. The renewable composite filter media of claim 4, in which each of the meltblown filtration media layers has a permeability of at least about 200 Frazier.

15. The renewable composite filter media of claim 4, in which the membrane filtration layer having an air permeability of about 10 Frazier to about 40 Frazier and a particle filtration efficiency of at least about 50% for 0.3 micron sized particles, and wherein the at least one additional meltblown media layer has an air permeability of about 30 to about 200 Frazier and having a particle filtration efficiency of at least 50% for 0.3 micron sized particles.

16. The renewable composite filter media of claim 15, in which the membrane filtration layer has a particle filtration efficiency of at least 75% for 0.3 micron sized particles and wherein the at least one additional meltblown media layer has an air permeability of about 60 to about 150 Frazier and a particle filtration efficiency of at least 85% for 0.3 micron sized particles.

17. The renewable composite filter media of claim 4 in which the membrane filtration layer and the meltblown filtration media layers are pleated such that the apices of the membrane filtration layer and meltblown filtration media layers are aligned.

18. The renewable filter media of claim 4 in which the filter media is shaped as a pleated panel.

19. The renewable composite filter media of claim 4 in which two edges of the filter media are joined to form a cylindrical filter media.

20. The renewable composite filter media of claim 4 in which the filter media is formed as a pleated cylinder.

21. A renewable composite filter media for removal of particles from a fluid stream comprising;

a) a membrane filtration layer comprising a porous hydrophobic ePTFE, the membrane filtration layer having an upstream side and a downstream side relative to the direction of fluid flow;
b) a support layer having an upstream side and a downstream side relative to the direction of fluid flow, the support layer disposed on the upstream side of the membrane filtration layer;
c) a first meltblown filtration media layer having an upstream side and a downstream side relative to the direction of fluid flow, the first meltblown filtration media layer having an electrostatic charge and disposed on the upstream side of the support layer; and
c) at least one additional meltblown filtration media layer removably attached to the upstream side of the first meltblown filtration media layer.

22. The renewable composite filter media of claim 21, in which the first meltblown filtration media layer is removably attached to the support layer.

23. The renewable composite filter media of claim 21, in which the membrane filtration layer having an air permeability of about 10 Frazier to about 40 Frazier and a particle filtration efficiency of at least about 50% for 0.3 micron sized particles, and wherein the at least one additional meltblown media layer has an air permeability of about 30 to about 200 Frazier and a particle filtration efficiency of at least 50% for 0.3 micron sized particles.

24. The renewable composite filter media of claim 23, in which the membrane filtration layer has a particle filtration efficiency of at least 75% for 0.3 micron sized particles and wherein the at least one additional meltblown media layer has an air permeability of about 60 to about 150 Frazier and a particle filtration efficiency of at least 85% for 0.3 micron sized particles.

25. The renewable composite filter media of claim 21, in which the membrane filtration layer and the meltblown filtration media layers are pleated such that the apices of the membrane filtration layer and meltblown filtration media layers are aligned.

26. The renewable filter media of claim 21, in which the filter media is formed as a pleated panel.

27. The renewable composite filter media of claim 21, in which two edges of the filter media are joined to form a cylindrical filter media.

28. The renewable composite filter media of claim 21, in which the filter media is formed as a pleated cylinder.

* * * * *